May 30, 1950 M. J. M. PARMENTIER 2,509,365

UNATTENDED REPEATER TESTING BY INVERSION OF THE CURRENT DIRECTION

Filed Oct. 30, 1945

INVENTOR

MAURICE JOSEPH MARIE PARMENTIER

BY A. D. Adams

ATTORNEY.

Patented May 30, 1950

2,509,365

UNITED STATES PATENT OFFICE 2,509,365

UNATTENDED REPEATER TESTING BY INVERSION OF THE CURRENT DIRECTION

Maurice Joseph Marie Parmentier, Paris, France, assignor to Compagnie Generale d'Electricite, Paris, France, a corporation of France Application October 30, 1945, Serial No. 625,585
In France December 4, 1944

3 Claims. (Cl. 179—175.31)

The present invention is concerned with the identification of that one of the units of a series of units of apparatus functioning simultaneously, the operation of which is defective.

It permits, in particular, determining without the need for direct manual access thereto of the position occupied in a series of units of apparatus by that intermediate one among them which is affected by total or partial for the operation.

It has for its object a method of identification of defective units of electrical apparatus connected in a chain of other units of apparatus which may be identical or not, functioning simultaneously, consists in attaching to each unit of apparatus, means presenting electric characteristics suitably selected which do not affect normal operation of the units but which in case of defect arising in one of them will influence, by reason of their presence, the resultant characteristics of the output of the chain of units and permit of determining the position of the defective units of apparatus by observation of the said resultant characteristics of the output.

The present invention is particularly applicable to the comparison of units of apparatus which under the action of an electric control applied to the identification elements, are capable of sending signals, which are different for each unit of the apparatus, an improperly operating unit of apparatus not sending any signal or sending a signal which is different from that which it would send when in proper operating condition.

The present invention is moreover applicable in a particularly simple manner to the comparison of any units of apparatus in which the defect likely to be produced is reported whatever be the cause by a modification of an electric constant of the said apparatus, for example its resistance or its capacity and so on.

The accompanying drawings, represent by way of example, to which the invention is not limited, the application of the present invention to the identification of faulty amplifiers on a long distance telephone transmission line.

Figures 1, 2, 3:
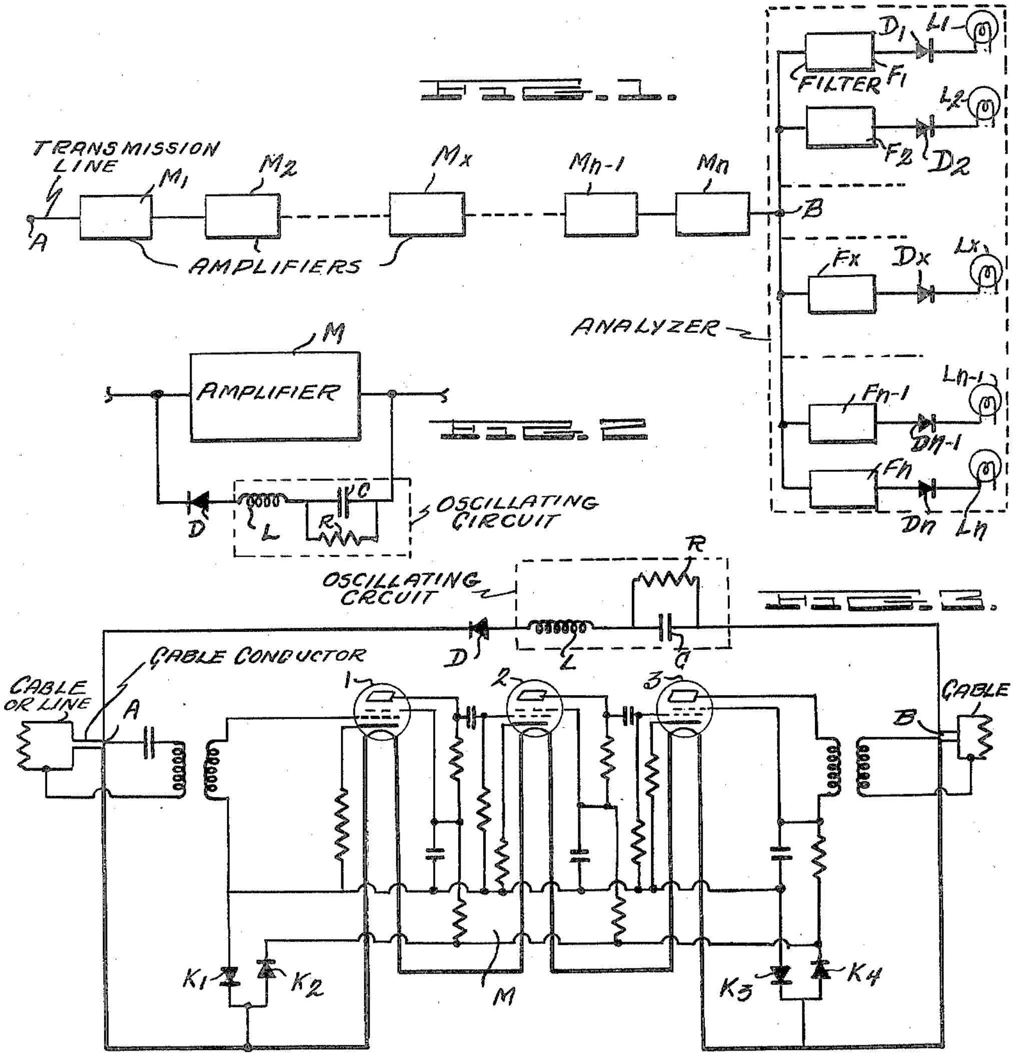
Fig. 1 shows the block diagram of a transmission line AB on which are arranged in series $n$ amplifiers $M_1$, $M_2$, $M_n$ this line being provided at its end B with a plurality of individual signalling means for indicating a fault and identifying which amplifier is at fault. The amplifiers may be at intermediate unattended stations.
Fig. 2 shows the oscillating circuit including a unilateral conducting element which is connected across an amplifier to identify its operating condition.
Fig. 3 shows the application of the oscillating circuit and unilateral conducting element unit of Fig. 2, to an amplifier on a communication transmission line in which the voltages applied to the electrodes of the tubes of the amplifier are supplied through rectifier bridges by direct current carried on the line.
Figure 5:
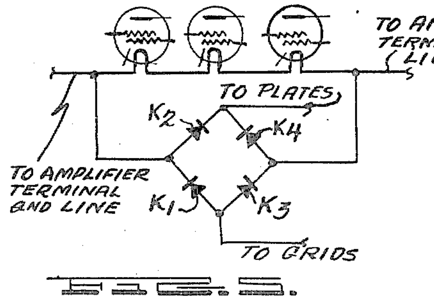
Figure 4:
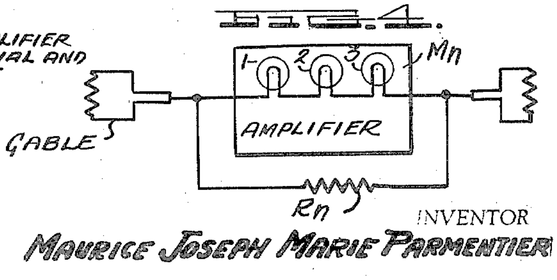

Fig. 4 shows a simple identifying resistance connected across an amplifier in a transmission line, in which the filaments of the tubes of the amplifiers are connected in series in the line; and Fig. 5 shows a detail of the rectifier bridge of Fig. 3, for applying potentials of appropriate polarity to the grids and anodes of the several tubes of an amplifier unit, regardless of the direction in which the supplied direct current is passing through the line.

The identifying element which forms the subject of the present invention consists in this instance of a circuit shunted across each amplifier and which under the action of a test current of a particular kind sent in the line when a test is desired, transforms an amplifier unit which is in normal amplifying condition into an oscillator, the characteristics of the affected circuit at each amplifier of the chain of the amplifier units being different, so that the oscillation of each of the latter is produced at a different frequency.

Referring to Fig. 1, if one of the amplifiers $M_x$ becomes defective in operation it cannot oscillate when the test current is sent its defect will interrupt the transmission of alternating current signals. If the amplifier in the position $M_x$ for example is defective, when the test current is sent from one of the ends A of the line, all the amplifiers will oscillate except amplifier $M_x$ which interrupts the transmission of alternating current signals, the end B of the transmission line then receives all of the frequencies of the several amplifiers located beyond amplifier $M_x$.

In order to determine the frequencies of the corresponding units, one may proceed by analysis or by automatic selective indication, each current of a particular frequency actuating, through the medium of filters $F_1$, $F_2$ . . . $F_n$, and detectors $D_1$, $D_2$ . . . $D_n$, signalling means such as the lamps $L_1$, $L_2$ . . . $L_n$ which will indicate visually the amplifier at fault.

The frequencies will be selected in such manner that their passage through the amplifiers, rendered less linear by oscillation, do not produce components which might falsify the interpretation of the analysis.

The same arrangement can be applied to a line comprising amplifiers in parallel.

Fig. 2 represents an example of a circuit permitting of transforming an amplifier into an oscillator by using as the test current, the normal line supply current for energizing the amplifier.

According to the present invention, a circuit composed of an individual local tank or oscillating circuit LCR and of a non-linear or unilateral conducting element D (for example a copper oxide cell) is placed in shunt with the amplifier.

In normal operation the direct current which energizes all of the tubes of all of the amplifier units, is sent along the transmission line in the direction for which the non-linear or unilateral conducting element D will pass no current, of D so that the functioning of the amplifier units will not be disturbed.

In locating a fault a test signal is sent by reversing the direction of the direct current on the line which unblocks the unilateral conducting element D and permits the operation of the amplifier which is in proper operating condition as an oscillator on a frequency which is determined by the values of the local circuit constants LCR.

Fig. 3 shows an embodiment of the preceding arrangement applied to an amplifier the filaments of which are supplied with direct current through the medium of the conductors of the line cable and in which there is used to supply the anodes and the screen grids of the several amplifier tubes overall voltage drop across the terminals of the circuit of the filaments of the several tubes of one amplifier.

The present invention provides further in the arrangement of Fig. 3, an arrangement of non-linear resistances or unilateral conducting elements, for example copper oxide cells which permit proper polarity of the voltage applied to the electrodes whatever may be the direction in which the current passes through the filaments.

Further referring to Fig. 3, shunted across the filaments of the several amplifier tubes 1, 2, 3, are two bridges of auxiliary unilateral conducting or rectifier cells one composed of $K_1$, $K_3$ and the other of cells $K_2$, $K_4$. Each auxiliary rectifier cell and each bridge has the position indicated in Figure 3. The general connections of the control grids and of the cathodes are made between the auxiliary rectifier cells $K_1$, $K_3$, those of the anodes and screens between auxiliary rectifier cells $K_2$ and $K_4$.

If the line current passes in the direction AB, the anodes take their potential through rectifier $K_2$ and the grids through rectifier cell $K_3$ the cells $K_1$ and $K_4$ being blocked. If on the other hand the line current passes from B to A the cells $K_1$ and $K_4$, unblocked by the anode currents, supply the desired potential, and the electrodes and the cells $K_2$ and $K_3$ are blocked.

Reversal of the direction of the line supply direct current which in the absence of auxiliary rectifier cells $K_1$, $K_2$, $K_3$, $K_4$ would produce the blocking or the unblocking of the network D, L, C, R, thus does not affect the normal operation of the amplifiers.

This circuit can be applied as well to different arrangements in which the direct current voltage to energize the amplifier is obtained from batteries, rectifiers and the like.

The circuits which have been described necessitate for transmission of the connecting frequencies, the continuity of the circuit of the cable or transmission line. The present invention permits also however in the case where the filaments of the amplifiers are supplied in series with the line cable, to identify the amplifier or amplifiers one of the filaments of which has broken.

Fig. 4 shows a circuit of such an arrangement. The identifying or signalling circuit is reduced here to a simple resistance $R_n$ shunted across the filaments of each amplifier and the value of which is a function of the position of the latter in the chain of units in the transmission line.

When the filament of a tube of an amplifier breaks, it is sufficient in order to check which tube is defective, to measure the resistance of the entire loop of the conductors of the cable starting from one end. The difference between the value thus measured and that resulting from the preliminary measurements taken when the filaments are in proper condition, permits of determining the value of resistance $R_n$ and consequently of locating the defective amplifier.

It is evident that any number of tubes may be used and that accessory arrangements may be made which fall within the scope of the present invention. For instance, one can provide systems of resistances in series with the filaments in order to maintain therein current at a constant value in spite of the shunt constituted by the resistance $R_n$; moreover there can be arranged in series with this resistance, non-linear elements which render the shunt ineffective for a certain direction of passage of the current. The resistance $R_n$ itself in certain cases may be non-linear or unilaterally conducting. Moreover the resistances may be selected so that the breakage of the filaments of several amplifier units may be characterised by a combined value which indicates the corresponding combination.

The same arrangement may be applied to amplifiers supplied in parallel, the resistance R being in this case placed in series with the filaments of each amplifier.

I claim:

1. In an arrangement for locating faulty operating amplifiers on a transmission line system, attended terminal stations, unattended intermediate stations, connected in series in said transmission line, each intermediate station comprising an amplifier, a source of direct current connected to said transmission line in one of said terminal stations for energizing said amplifiers, a plurality of individual tank circuits respectively connected in derivation on each of said amplifiers, each said tank circuit comprising a tuning circuit connected in series with a rectifying element, the tuning circuits of each amplifier having different electrical constants, said rectifying element being so poled as to prevent the direct current normally flowing through the transmission line to pass through said tuning circuit, and to allow a direct current of opposite sense to pass through said tuning circuit in such a way that each amplifier in good order of operation then constitutes with its individual tuning circuit an oscillator of a determined frequency, means at one of said terminal stations to reverse the polarity of the source of direct current energizing the amplifiers, means for allowing the normal operation of said amplifiers in spite of the reversal of the energizing current, and multiple frequency selecting and indicating means at one of said terminal stations for indicating which of the various frequencies produced by said amplifiers so operating as oscillators are present at said terminal station.

2. In an arrangement as set forth in claim 1, in which each amplifier comprises at least one tube the filament of which is directly connected between the input and output terminals of said amplifier, a set of bridge-connected rectifying elements for each of said amplifiers, two opposite summits of said bridge being connected respectively to the input and output terminals of the amplifier, one of the other summits being connected to the plate circuit of the tube, and the fourth summit being connected to the grid circuit of the tube, the rectifying elements being so poled in the arms of the bridge that the plate of the tube is always at a positive potential, and the grid at a negative potential, with respect to the filament, whatever the direction of the current flowing through the transmission line.

3. In an arrangement for locating faulty operating amplifiers on a transmission line system, attended terminal stations, unattended intermediate amplifiers each having an input terminal and an output terminal, connected in series in said line, a plurality of individual tank circuits respectively connected in parallel on each of said amplifiers, each said tank circuit comprising connected in series a rectifying element and a tuning circuit, the said tuning circuits of each of said amplifiers having different electrical constants and constituting, respectively, with the corresponding amplifiers in good order of operation, oscillators of different frequencies when direct current is allowed to pass through the rectifying elements, said rectifying elements being all poled to pass direct line current in the same direction, means at one terminal of the line for applying such a current to said line, and multiple frequency selecting and indicating means at the second terminal of said line for indicating which of the various frequencies produced by said amplifiers so operating as oscillators are present at said second terminal of said line.

PARMENTIER, MAURICE JOSEPH MARIE.

REFERENCES CITED

The following references are of record in the file of this patent:

UNITED STATES PATENTS

| Number | Name | Date |
|---|---|---|
| 1,369,403 | Demarest et al. | Feb. 22, 1921 |
| 1,677,967 | Holden | July 24, 1928 |
| 2,021,978 | Almquist et al. | Nov. 26, 1933 |
| 2,017,175 | Abraham | Oct. 15, 1935 |
| 2,083,666 | Potter | June 15, 1937 |
| 2,208,417 | Gilbert | July 16, 1940 |
| 2,244,751 | Werrmann | June 10, 1941 |
| 2,260,160 | Benning et al. | Oct. 21, 1941 |
| 2,321,723 | Zinn | June 15, 1943 |